Aug. 2, 1960
S. A. McCLUSKY
2,947,011
MECHANICAL WATER-REMOVING DEVICE
Filed Sept. 30, 1958
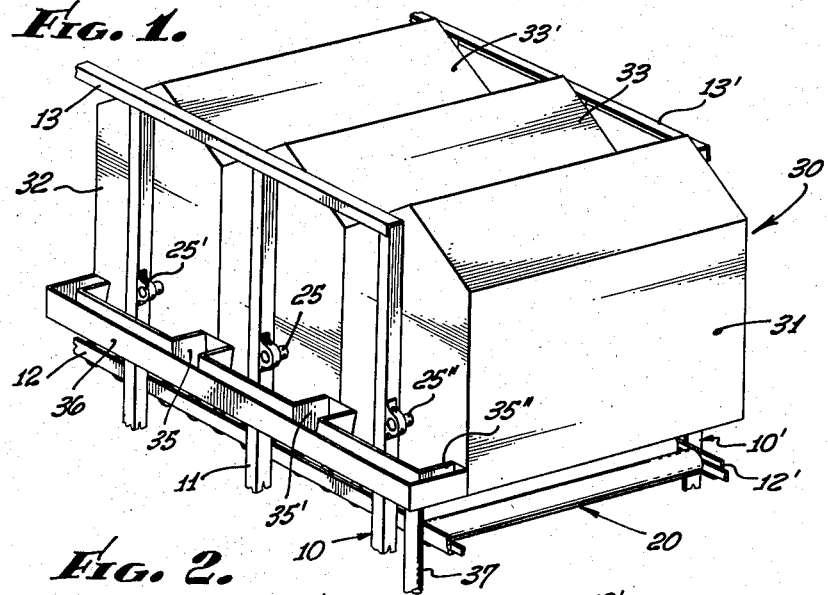
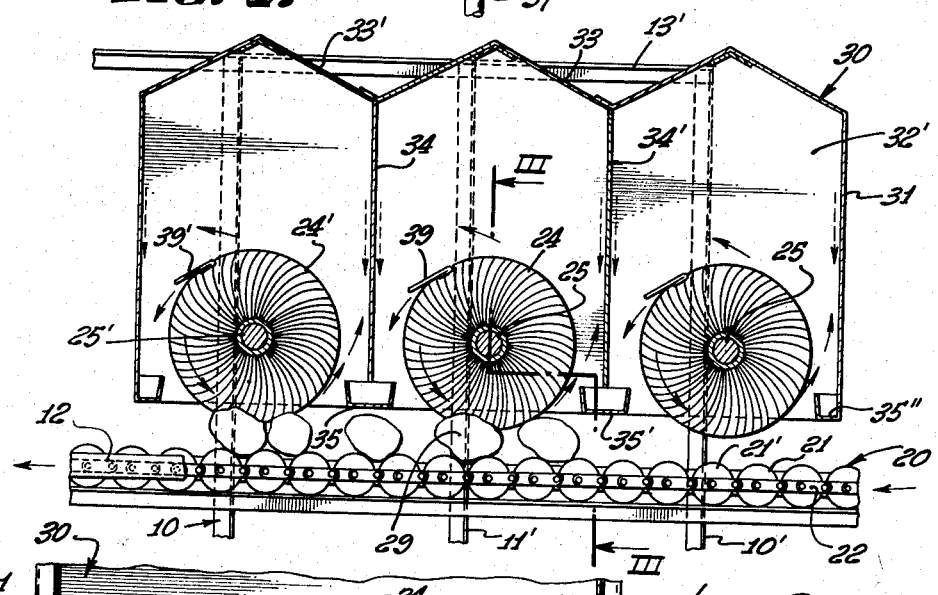
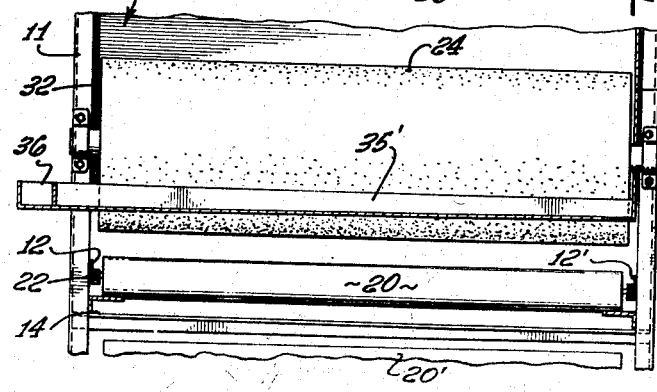
INVENTOR.
STANLEY A. McCLUSKY
BY
Miketta and Glenny
ATTORNEYS.

United States Patent Office 2,947,011
Patented Aug. 2, 1960

2,947,011
MECHANICAL WATER-REMOVING DEVICE
Stanley A. McClusky, 3001 Baylor Ave., Bakersfield, Calif.
Filed Sept. 30, 1958, Ser. No. 764,389
5 Claims. (Cl. 15—3.17)

This invention relates to a simple and effective device for removing free water from the surfaces of fruit and vegetables.

In the treatment of many fruits and vegetables including potatoes, tomatoes, citrus fruit, apples and the like, it is necessary and desirable to wash or otherwise treat the fruit before it is waxed, packaged or bagged. In view of the fact that most fruits and vegetables are sensitive to heat, it is not convenient or practicable to employ dryers employing sufficiently high temperatures to evaporate the residual free moisture left on the surfaces of the fruit. It is, however, necessary to remove the free water as rapidly as possible in view of the fact that the fruit may become moldy or decay if it is maintained in a wet or moist condition for any appreciable length of time. Moreover, it is necessary to remove the water thoroughly and rapidly so as to prevent the accumulation of large amounts of fruit or vegetables in process. This drying or removal of free moisture from the surfaces of fruit and vegetables has been a troublesome problem in the packing industries and many attempts have been made in the past to provide equipment capable of rapidly and effectively removing the moisture from the fruit without damaging the often tender skin, peel or surface of the fruit or vegetable. In such prior attempts, certain types of fruit have been rolled over absorbent blankets or over absorbent porous rolls which were supposed to remove the free moisture by absorption, other portions of the same roll being then squeezed to wring out the water thus absorbed; in other instances, brass rolls have been employed and the water clinging to such rolls then scraped off. None of these prior devices and methods have been successful and, in some instances, it has been attempted to facilitate the removal of free water from the surfaces by the use of chemical agents in the water. These prior expedients have not been satisfactory because various fruits and vegetables differ in size, contour and symmetry; a potato cannot be treated on the same type of roll which is capable of handling completely spherical fruits such as oranges.

The present invention is directed to an extremely simple form of device which operates rapidly without any damage to the tender skin or peel of the fruit or vegetable being treated. It has been found that by the use of cylindrical brushes composed of very thin, long, flexible and non-absorptive synthetic fibers, such brush rolls operating at high speed, the free moisture can be removed from the surface of the fruit and vegetable in a very rapid and economical manner without any damage to the skin or peel. The use of absorbent blankets or absorbent porous rollers is eliminated. Such brushes alone are ordinarily not effective, but in combination with a housing and associated gutters which collect the spray of moisture removed from the fruit, the equipment becomes effective. In addition, stripping means are employed in operative contact with the brush rolls to expedite and thoroughly remove the moisture from the fibers of the rolls, with the result that the fruit moving beneath these brushes on a conveyor are rapidly dried and are ready for further treatment, bagging or packaging within a remarkably short period of time.

An object of the present invention therefore is to disclose and provide a simple and effective device for rapidly removing free water from the surfaces of fruit and vegetables.

A further object of the invention is to disclose and provide a device for mechanically removing aqueous liquids from the surfaces of fruit and vegetables by a novel arrangement of simple and efficient elements.

Another object is to disclose and provide a new combination of structural elements, cooperatively related, whereby free water and aqueous liquids may be readily removed from the surfaces of fruit and vegetables without damage to such surfaces.

Others objects and advantages of the present invention will become apparent from the description given hereinafter of an exemplary form of device. In order to facilitate understanding, reference will be had to the appended drawings wherein:

Fig. 1 is a perspective view of one end of a drying device of the present invention.

Fig. 2 is a longitudinal section through a portion of such device, the section being enlarged and simplified.

Fig. 3 is a transverse section taken along the plane III—III in Fig. 2.

Generally stated, the device of the present invention includes a suitable framework 10 on which there is mounted a conveyor such as the roller conveyor 20, adapted to carry fruit or vegetables in substantially a single layer through the drying device of the present invention. This device embodies a housing 30 containing the arrangement of brushes, collection gutters, stripping slats, etc. which will be described in greater detail hereinafter.

The apparatus includes any suitable framework; for example, vertical posts 10, 10', 11 and 11', etc., are interconnected by horizontal members or guide elements 12, 12', etc. Other horizontal longitudinally extending frame members 13 and 13' and suitable transverse connectors such as 14 are employed. Structural steel shapes and welding are commonly employed in the manufacture of frames for devices of this sort.

Any type of conveyor 20 may be used but a roller type is preferred. Rollers 21, 21', etc. may have their end pins journalled to continuous chains 22 which are slidably supported in the longitudinally extending guide elements 12 and 12'. Such continuous chains may pass over end sprockets which are then suitably driven, the continuous conveyor thus forming the upper lay 20 and a lower lay 20'.

A plurality of transversely extending cylindrical brushes are suitably journalled above and out of contact with the conveyor 20. Each of the brushes 24, 24', etc. has its shaft 25 journalled in suitable pillow blocks suitably connected to the framework of the device. Means are also provided for driving all of these cylindrical brushes and as illustrated in Fig. 3 such driving means may include a sprocket 26 mounted upon one end of the shaft 25, the sprockets so connected to each of the shafts of the various brushes being then interconnected by means of a chain and to a motor drive.

Attention is called to the fact that the cylindrical brushes 24, 24', etc. are of relatively large diameter and are provided with long, thin, flexible, resilient, non-absorptive bristles, the bristles or fibers being preferably of a synthetic material such as a polyamid, polyethylene polymer, cellulose acetate, or polyvinyl type polymer. In actual practice it has been found that these synthetic fibers or filaments from which these brushes are made preferably have a diameter of not over about 0.01 inch and, in actual practice, nylon fibers of 0.008–9 inches have been found very effective. Moreover, the length of each of these fibers should be not less than twice the vertical thickness of a bed of fruit or vegetables on the conveyor 20. Moreover, it has also been determined that for most effective operation the cylindrical brushes 24, 24', etc. should be driven at a relatively high speed, that is, at a speed sufficient to impart a linear speed of between 800 and 2,000 feet per minute at the circumference of the brushes. Although Fig. 2 indicates that all of the cylindrical brushes 24, 24', etc. are rotated in the same direction, and in a direction opposed to the direction of travel of the conveyor 20, this particular arrangement is not essential although it has been found desirable. The brushes 24, 24' could revolve in the same direction as the direction of travel of the conveyor, the conveyor normally moving at a rate of between 30 and 90 feet per minute (generally at about 40 to 60 feet per minute) which is relatively slow in comparison to the high linear circumferential speed of the brushes 24 and 24'.

The housing 30 is provided with end walls such as 31, side walls 32 and 32' and a roof which is preferably formed as a series of gables 33, 33', etc. A series of vertical partitions is positioned within the housing, each partition extending between adjacent cylindrical brushes; these vertical transversely extending partitions are indicated at 34 and 34' in Fig. 2, and it will be noted that the partition 34 extends between the adjacent cylindrical brushes 24 and 24'. The gable roof 33 interconnects the upper ends of the partitions 34 and 34'. Each of these transversely extending partitions carries a collection gutter 35 at its lower end, said collection gutter extending transversely in a plane below a horizontal plane passing through the axes of rotation of the brushes 24 and 24', but above a bed of fruit or vegetables 29 carried on the conveyor 20. The end walls such as the end wall 31 of the housing is also provided with a gutter as indicated at 35''. One end of each of these collection gutters extends through a suitable opening in the side wall of the housing and is in communication with a discharge gutter 36 extending longitudinally of the machine and provided with a discharge outlet 37 leading to a suitable drain, sewer or other point of disposal.

In addition to the gutters, the housing includes a plurality of what have been termed strip slats such as the strip slats 39, 39', etc. One longitudinal edge of each of these strip slats is adapted to come in contact with the outer end portions of the fibers composing the brush, the other end of the strip slat being inclined and at a lower plane adjacent the partition 34. The ends of these strip slats are fastened to the side walls 32 and 32' of the housing and may be adjustably positioned so as to vary the inclination of the strip slat and the degree of contact with the end portions of the fibers of the brushes. As best illustrated in Fig. 2, the brush contacting longitudinal edge of a strip slat 39 contacts the cylindrical brush below its apex and above the horizontal plane passing through the axis of rotation, that is, at an angle of approximately 40° to 60° with the horizontal and on that portion of the circumference of the brush which is moving downwardly towards the conveyor 20. This normally places the outer edge of the strip slat 39 adjacent the vertical partition 34 and above the horizontal plane passing through the axis of rotation of the brush.

It is to be understood that in actual operation fruit and vegetables such as, for example, potatoes, tomatoes, citrus fruit, or the like, are picked up out of a wash tank or from a spraying zone or chamber and fed by the conveyor 20 beneath the water-removing device of the present invention. Such fruit or vegetables (diagrammatically illustrated at 29) carry tremendous amounts of water on their exterior surfaces. The very soft, flexible, high speed brushes 24, 24' and the like brush the water off the surfaces of the fruit and spatter it upwardly. The spattering is indicated by small arrows adjacent the periphery of the brush 24. Much of the moisture removed by these brushes is spattered against the vertical transverse partitions 34 and 34' and flows down those partitions into the gutters 35, 35' and the like. Because of the high speed of the brushes 24, some water is actually thrown upwardly against the roof and the gable formation such as is indicated at 33 again directs the water collecting thereon toward the partitions 34 and 34' for collection in the gutters 35 and 35'. In many instances, the dispersal of water from the non-absorptive flexible fibers of the brushes is sufficiently adequate so as to eliminate the necessity or desirability of employing the strip slats 39, but in many instances it has been found desirable to employ the strip slats 39 since they cause an additional flexure of the end portions of the brush fibers, strip moisture therefrom, direct such moisture toward the partition 34 and permit the moisture to drip into the gutter 35 located therebeneath, and in addition the flexing of the outer portions of the fibers causes them to flip whatever moisture may remain thereon in the direction of the gutter for collection therein. Therefore, each brush 24 is substantially dry when it comes into contact with the fruit or vegetable on the conveyor and most effectively removes the moisture therefrom. It is also to be remembered that the roller conveyor 20, illustrated in the drawings, rotates as it moves longitudinally so that the fruit or vegetables are rolled and fresh surfaces are exposed to the action of the brushes as the fruit progresses through the device.

It may also be noted that the bottoms of the various collection gutters 35, 35', etc. are preferably slightly inclined toward the outer discharge gutter 36.

A complete device of the character described hereinabove may contain 4, 6 or as many as 10 transverse, high speed, water-removing, cylindrical rolls. Fig. 2 only illustrates 3 in order to show the general arrangement without excessive detail. As a specific example, reference may be had to the fact that potatoes have been most effectively dried in a device of the character shown employing but 4 transverse brushes rotating at a speed of 350 r.p.m.; these brushes were 14 inches in diameter having a free fiber length of approximately 7½ inches. Fibers were of nylon and had a diameter of approximately 0.009 inch; the individual rollers of the conveyor had a diameter of about 2½ inches.

Substantially the same machine was also successfully employed in removing surface water from tomatoes without any injury to the skins. It is to be understood that the machine may be employed on various citrus fruit, deciduous fruit such as apples, etc. The brushes may be made in any suitable manner and all changes and modifications coming within the scope of the appended claims are embraced thereby.

I claim:

1. A device for mechanically and effectively removing free water from the surfaces of fruit and vegetables comprising, in combination with a non-absorbent roller conveyor adapted to roll and convey a bed of fruit and vegetables longitudinally: a plurality of cylindrical brushes extending transversely above and out of contact with said conveyor, each of said brushes being composed of thin, long, flexible, resilient and non-absorptive fibers, said cylindrical brushes being in spaced relation and mounted for rotation; means for driving said cylindrical brushes; and a substantially vertical partition between adjacent cylindrical brushes, a collection gutter carried by the partition in a plane below a horizontal plane passing through axes of rotation of said brushes but above a bed of fruit and vegetables on said conveyor and a longitudinally extending discharge gutter in communication with said collection gutters.

2. A device as stated in claim 1 wherein the thin, non-absorptive fibers of said cylindrical brushes have a length of not less than twice the thickness of the bed of fruit and vegetables on said conveyor.

3. A device as stated in claim 1 wherein the thin, long, non-absorptive fibers of said cylindrical brushes have a length of not less than twice the thickness of the bed of fruit and vegetables on said conveyor and said driving means are adapted to drive said cylindrical brushes at a linear circumferential speed of between 800 and 2,000 feet per minute.

4. A device as stated in claim 1 wherein said transverse cylindrical brushes are enclosed in a housing including end walls, side walls and gable roof portions interconnecting successive transverse vertical partitions within said housing.

5. A device as stated in claim 1 including an inclined strip slat positioned adjacent a cylindrical brush, one marginal edge portion of said strip slat being adapted to contact terminal end portions of fibers of said cylindrical brush to flex the same and to strip water therefrom and direct it toward a collection gutter.

References Cited in the file of this patent

UNITED STATES PATENTS

| | | |
|---|---|---|
| 1,864,085 | Moe | June 21, 1932 |
| 1,943,874 | Moe | Jan. 16, 1934 |
| 2,597,946 | Olson | May 27, 1952 |